Figure 1:
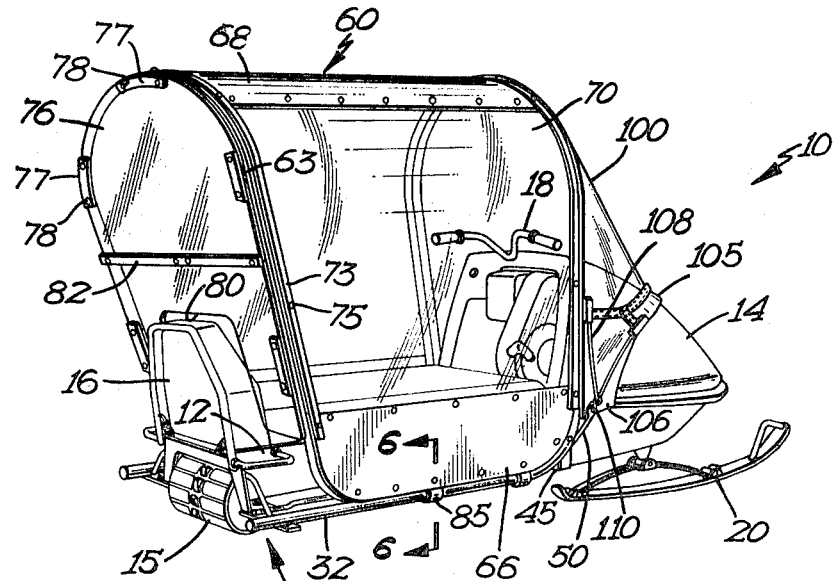

United States Patent

[11] 3,599,740

[72] Inventor Werner W. Martinmaas
 835 Tenth Ave. N.W., Watertown, S. Dak.
 57201
[21] Appl. No. 820,125
[22] Filed Apr. 29, 1969
[45] Patented Aug. 17, 1971

[54] SNOWMOBILE CAB ASSEMBLY
 17 Claims, 12 Drawing Figs.
[52] U.S. Cl. .................................................. 180/5 R,
 296/28 C, 296/146, 296/104, 180/9.24 R
[51] Int. Cl. ...................................................B62m 27/02,
 27/02, B62d 33/06
[50] Field of Search............................................ 180/5;
 296/146, 104, 28 C, 24, 31 P, 37; 280/150;
 244/121

[56] References Cited
 UNITED STATES PATENTS
2,441,132 5/1948 Blakey ........................ 280/150 F X

| 2,464,884 | 3/1949 | Noyes............................ | 296/104 UX |
| 2,549,938 | 4/1951 | Seaman......................... | 296/104 |
| 2,656,904 | 10/1953 | Grenier.......................... | 180/5 UX |
| 3,481,416 | 12/1969 | Caron............................ | 180/5 |

OTHER REFERENCES
Motrak Corporation Parts List - Published Nov. 1966 by Motorak Corp. Minneapolis, Minn.

Primary Examiner—Richard J. Johnson
Attorney—Schroeder, Siegfried & Ryan

ABSTRACT: A snowmobile cab assembly adapted to be used universally on all snowmobile models. The cab assembly includes a slidable cab mounted on a frame attached to the snowmobile with the cab frame and the mounting frame providing a roll bar structure for safety purposes in snowmobile operation. The cab assembly is demountable and may mount the windshield for the snowmobile if desired.

PATENTED AUG 17 1971

3,599,740

SHEET 1 OF 3

INVENTOR.
WERNER W. MARTINMAAS
BY
Schroeder, Siegfried
& Ryan
ATTORNEYS

INVENTOR.
WERNER W. MARTINMAAS
BY
Schroeder, Siegfried
& Ryan
ATTORNEYS

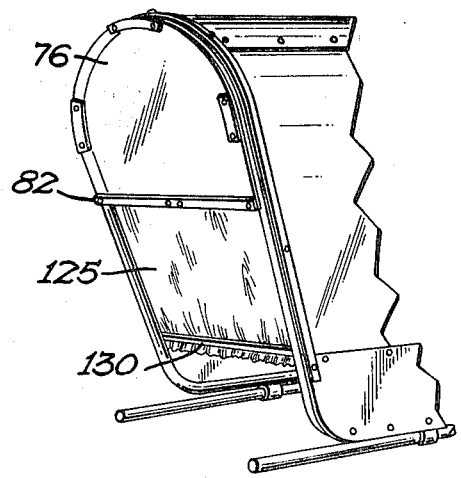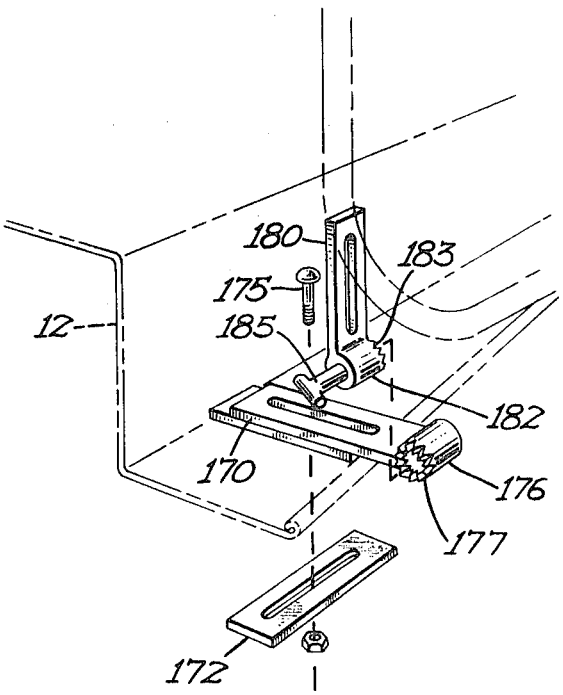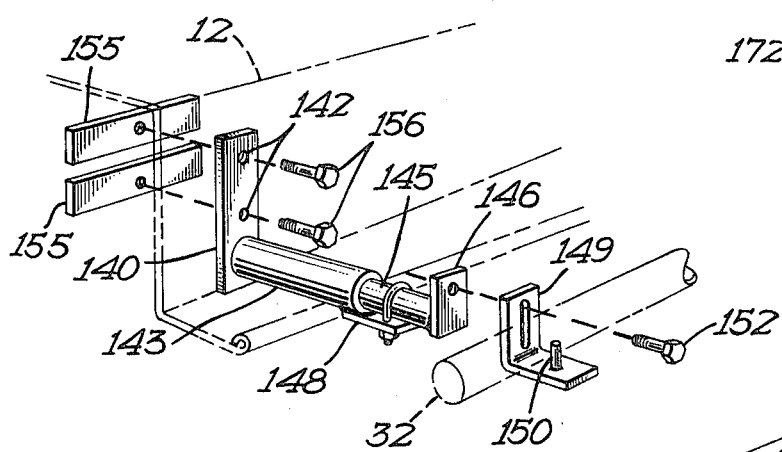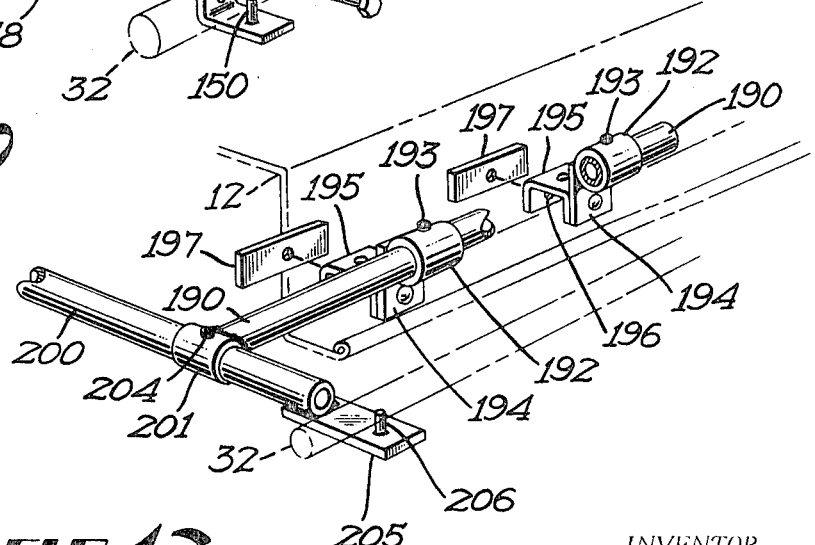

3,599,740

1

SNOWMOBILE CAB ASSEMBLY

My invention relates to cabs particularly adapted for use with snowmobiles and more particularly to an improved cab applicable to all types of snowmobiles which forms a roll bar safety structure for the snowmobile as well as a protective enclosure.

Cab assemblies have previously been incorporated into tractor-type vehicles and equivalent power units which are normally not supplied with protective enclosures for the occupant operator. Such structures have been made demountable or removable to permit vehicle use with and without the cab structure. However, such prior cab constructions have been complex and are designed for the specific apparatus or vehicle with which it is to be associated. Further, such structures do not provide any protective support from a standpoint of roll protection upon upsetting of the vehicle.

In the present invention an improved snowmobile cab design is provided which permits universal mounting on all types of snowmobiles and which incorporates a rigid support and a shape which will provide roll protection for the occupant of the vehicle. The improved cab construction may cooperate with existing windshield structures on snowmobiles or may provide the mounting for the windshield and has removable panel sections for emergency exits to the occupant in the event of rolling. It incorporates a basic mounting frame which is mounted to the snowmobile frame through support brackets such that it is applicable to all types of snowmobiles and includes a transversely extending curved support bar designed to mount or cooperate with an existing windshield to complete the enclosure. The cab includes a slidable hood mounted on the frame which is removable for usage without the same, such as during racing. In addition, the improved cab permits removable mounting of the back and front sections of the same and incorporates a design provision which will permit the assembly to be used for all sizes and types of snowmobiles.

It is, therefore, the principal object of this invention to provide a snowmobile cab assembly with provisions for roll protection.

Another object of this invention is to provide for a snowmobile an improved cab construction of the slidable or removable type with transparent enclosures to permit weather protection to the occupant operator and complete line of vision from the same.

Another object of this invention is to provide an improved snowmobile cab assembly which is easy to install and maintain.

Figure 2:
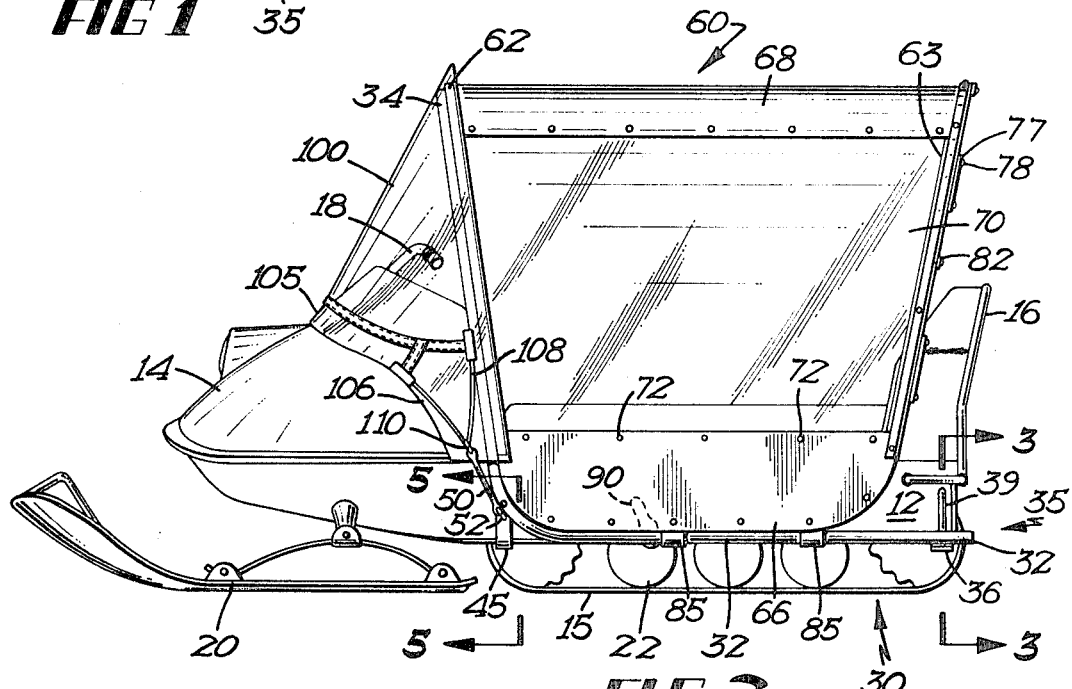
Figure 3:
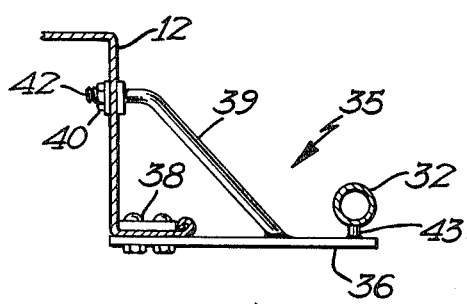
Figure 4:
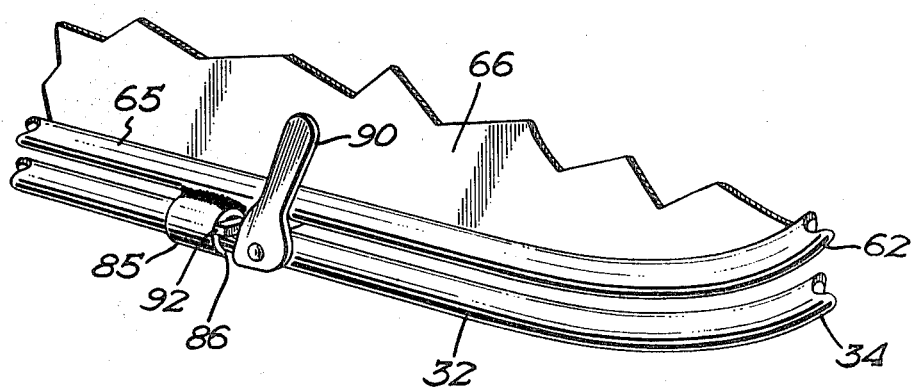
Figure 5:
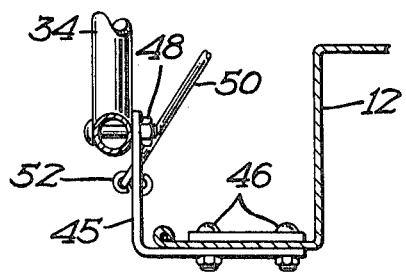
Figure 6:
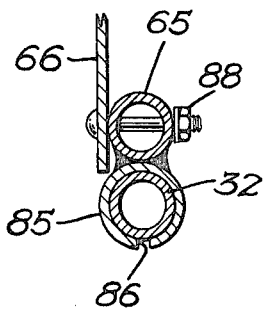
Figure 8:
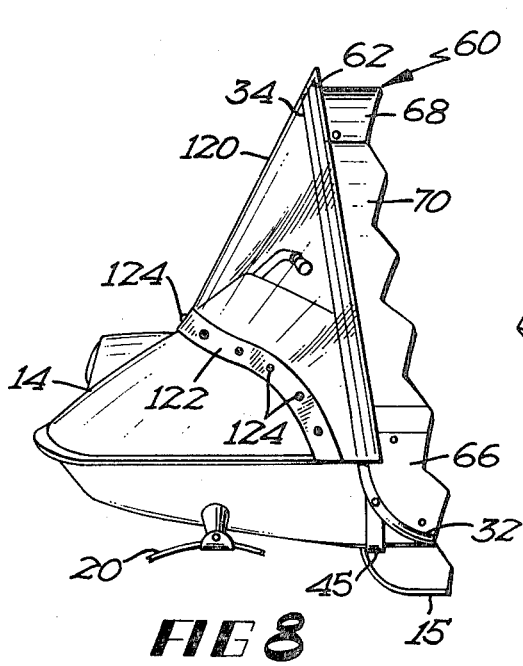
Figure 7:
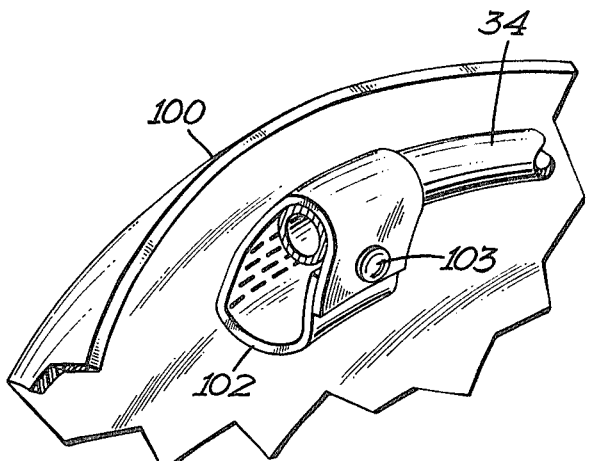

These and other objects of this invention will become apparent from a reading of the attached description together with the drawings, wherein;

FIG. 1 is a perspective view of my improved snowmobile cab shown in connection with a snowmobile, FIG. 2 is a side elevation view of the snowmobile of FIG. 1 with my improved snowmobile cab, FIG. 3 is a sectional view of a portion of a snowmobile cab shown in FIG. 2 and taken along the lines 3–3 therein, FIG. 4 is a perspective view of a portion of the improved snowmobile cab showing a latch for the hood portion thereof, FIG. 5 is a sectional view of the rear portion of the improved snowmobile cab taken along the lines 5–5 in FIG. 2, FIG. 6 is a sectional view of a portion of the mounting for the snowmobile cab as taken along the lines 6–6 of FIG. 1, FIG. 7 is a perspective view of a portion of the snowmobile cab showing the windshield mounting, FIG. 8 is an elevational view with parts broken away of the snowmobile with my improved snowmobile cab and showing an alternate mounting embodiment for the windshield portion thereof, FIG. 9 is a perspective view of a portion of my improved snowmobile cab showing an alternate construction for the rear of the cab, FIG. 10 is an exploded view of an alternate mounting assembly for the improved snowmobile cab,

2

FIG. 11 is an exploded view of another embodiment of a mounting assembly for the improved snowmobile cab, and FIG. 12 is an exploded view of a further embodiment of a mounting assembly for the improved snowmobile cab.

My improved snowmobile cab assembly as shown in FIG. 1 and 2 installed on a snowmobile which is indicated generally at 10. This improved cab assembly is adapted in its various versions to fit any type of snowmobile, and as such to have universal application for this purpose. Thus the snowmobile may vary in form, but will generally include a main frame indicated at 12 with a hood 14 enclosing a motor (not shown) operatively connected to a track mechanism 15 positioned in a recess and protruding from the lower edge of the frame. The snowmobile includes a back seat portion 16 and a suitable steering mechanism indicated by the handlebars 18 operatively connected to a pair of supporting and steering skis 20 positioned on the under portion of the engine or cowl section. As will be seen in side elevation view, the track mechanism will normally include a number of roller guide members 22 which will support the track in driving relationship.

The improved snowmobile cab assembly is attached to the snowmobile frame through a mounting frame, indicated generally at 30, which is generally U-shaped or bifurcated in construction with its curved or intermediate portion bent normal to the ends such that the ends will fit along the side of the snowmobile and be attached thereto. Thus in FIGS. 1 and 2 it will be seen that the mounting frame includes straight side portions 32 with a curved central portion 34 which is bent substantially normal to the side portions and with this mounting frame being constructed of a generally tubular material preferably formed of a steel material. This mounting frame will be attached to the snowmobile frame through suitable mounting brackets at the side portions 32. In FIG. 3 a rear mounting bracket is shown which attaches to the rear edge of the snowmobile, this mounting bracket being indicated at 35 and incorporating a platelike member 36 adapted to be attached to the lower edge of the mounting frame through suitable bolt means, such as is indicated at 38, with a tubular brace 39 welded thereto at one extremity and secured to the frame through a suitable nut means 40 connected to or threaded over the threaded extremity 42 of the brace. The plate 36 includes an upstanding pin 43 to which the tubular side portions 32 are attached through suitable means, such as welding. The forward end of the straight side portions 32 of the mounting frame at the bend area defining the ends of the upstanding curved portion 34 of the frame is attached to the sides of the frame 12 of the snowmobile, as indicated in FIG. 5, by an angle bracket 45 suitable attached to the forward edge of the frame 12 through nut and bolt connections indicated at 46 with the upstanding portion of the flange being connected to the curve portion of the frame through a nut and bolt connection, as indicated at 48. This mounting flange includes an anchor link 50 attached to the bracket through metallic loops 52 with the extremity of the same being adapted to secure a portion of the hood of the snowmobile, as will be hereinafter defined. With the mounting of frame formed by the straight side portions 32 and the curve portion 34 on a frame of a snowmobile 12, the side portions will be spaced from the frame and extend parallel thereto with the curve portion being located adjacent the end of the hood or engine section of the snowmobile and extending up around the same with the curve portion being sufficiently rigid to define a roll bar support for the occupants of the snowmobile.

This mounting frame formed by the parts 32, 34 mounts a cab structure indicated generally at 60 which cab structure is formed by a tubular frame member having arcuate forward and rear braces 62, 63 which are curved symmetrically with the curve portion 34 of the mounting frame and straight interconnecting portions 65 which mount the cab on the straight portions 32 of the mounting frame. This structure may be formed of a continuous tubular metal member of sufficient strength to provide support as part of the roll bar structure and will define the frame upon which the remaining portion of the cab is built. Suitable base reinforcing plates 6 are connected to the lower curve edge and straight portion 65 of the cab frame and a similar curve metallic sheet 68 extends between the front and rear braces at the top of the same. The reinforcing sheets 66, 68 also serve to mount curve Plexiglass covers 70 over the sides of the same through suitable means such as screws 72. These are secured to the front and rear braces 62, 63 through reinforcing strips 73 and suitable screws 75. The front brace 62 bears the same angle to the vertical as the curve portion 34 of the mounting frame which is slightly inclined forward, as shown in FIGS. 1 and 2, while the rear brace or frame 63 is oppositely inclined to the vertical defining an inwardly receding top to the cab for wind resistance purposes. The back of the cab similarly mounts a Plexiglass plate or cover 76 secured to the rear brace 63 through reinforcing strips 77 and screws 78 which in one embodiment extends, as shown in FIG. 1, substantially to the base of the cab and has a suitable recess opening 80 cut therein to fit around the rear seat 16 of the snowmobile. A transversely extending reinforcing strip 82 is included in this back assembly and secured to the rear brace 63 of the cab for reinforcing purposes.

The cab is mounted on the mounting frame or the straight portions 32 thereof through suitable guides or split loop couplings 85 which fit over the straight portions and slide thereon. The split in each of the guides or loop couplings, as indicated at 86, is of such dimension so as to allow the coupling to slide around the mounting pin 43 positioning the straight portions 32 of the frame on the mounting braces. As will be seen in FIG. 6, the slide couplings 85 are suitably secured to the straight portion 65 of the brace frame by means such as welding, and the brace frame has the reinforcing metallic side structure 66 attached thereto through means such as screws or nuts and bolts 88. The cab with this mounting is adapted to slide on the straight portions 32 of the mounting frame and in the forward position will align with and abut against the curved portion 34 of the mounting frame to complete the enclosure. A suitable lock structure of the friction type, as shown in FIG. 4 and indicated at 90, includes a pivoted lever secured to the straight portion 65 of the brace structure of the cab with a deflecting plate 92, also secured to the straight portion 65 of the brace structure, and having suitable friction material thereon being engaged by the lever upon pivoting to flex the plate 9 and frictionally engage the straight portion 32 of the mounting frame and lock the cab with the mounting frame to hold the same in position thereon. The friction latch, which is positioned on the interior of the cab structure, may be released to permit the cab to slide along the extent of the mounting frame for ingress of and egress of occupants or operators. For running purposes, the cab will be moved forward on the mounting frame to abut against the curved portion thereof and be locked in such a position.

The enclosure of the cab assembly is completed with the windshield, which may or may not be included as a part of the snowmobile. In FIG. 1, the windshield, which is indicated at 100, is adapted for varying size snowmobiles and is secured at its rearward edge to the curved portion 34 of the mounting frame through flexible flap members 102 attached to the Plexiglass windshield and having snap portions 103 adapted to fit around the curved portion of the mounting frame 34 and be snapped thereon. This will secure the rearward edge of the windshield to the mounting frame and the forward edge of the same, as indicated in FIGS. 1 and 2, and will include a flexible plastic apron-type flap, as indicated at 105, which will fit around the surface of the hood 14 of the snowmobile with side flap sections 106 stretched over the side of the hood. Suitable draw strings, such as is indicated at 108, draw the forward edge of the windshield against the hood of the snowmobile and hold the flap and side sections down against the same, the draw strings being connected to the loop extremity 110 of the connecting member 50 secured to the forward mounting frame bracket 45 for the mounting frame.

With the permanent windshield mounted on the snowmobile, the windshield construction, shown in FIGS. 1 and 2, is omitted. The permanent snowmobile windshield will bear against or be positioned adjacent the curved portion of the mounting frame without being connected thereto. A similar construction for a windshield is shown at 120 in FIG. 8 wherein the windshield may or may not be connected to the curved portion of the frame 34 as shown in FIG. 7, but is attached to the hood 14 of the snowmobile by means of a flexible fabric-type connecting band 122 with suitable snap fasteners 124 thereon which secure the Plexiglass windshield to the contour of the hood of the snowmobile allowing the rear edge to bear against the mounting frame 34.

The back end of the snowmobile cab may be modified, as shown in FIG. 9, to include only a solid upper section of Plexiglass material suitably secured thereto by braces 77 and screws 78 at the rear brace 63 above the brace 82. The lower portion of this structure beneath the support brace 82 for the same is covered by a flexible plastic material, such as is indicated at 125, with sufficient material being included across the lower half of the back of the cab to fit around a snowmobile seat and conform thereto. A suitable elastic binding 130 is included with and attached to the flexible plastic material to complete the enclosure and insure that the flexible portion will fit around a seat and conform thereto.

FIGS. 10 and 11 show variations of the mounting brackets for the rear and front, respectively, of the mounting frame to permit versatility in adjustment in the mounting of the tubular mounting frame at the straight portions 32 thereof. In FIG. 10, the rear mounting bracket is comprised of a flange plate 140 with apertures 142 therein and a cylindrical sleeve member 143 attached thereon and extending transversely therefrom. The sleeve member mounts the shaft 145 to which is connected a mounting plate 146 with the shaft 145 being adapted to be adjustably positioned in the sleeve member 143 through a yoke-type bracket mounting 148 secured to the sleeve 143 and adapted to hold the shaft 145 and flange 146 in position relative to the supporting sleeve 143. A suitable angle plate 149 with a pin 150 thereon will mount the straight portion 32 of the mounting frame with the angle bracket 149 being held to the plate 146 through a suitable mounting screw 152. The support plate 140 of this mounting structure will be secured to the frame of a snowmobile, as indicated at 12, through reinforcing plates 155 and suitable bolt means 156 which mount the supporting bracket structure thereon. This structure permits spacing of the mounting frame portion 32 from the sides of the frame of the snowmobile and angularly with respect thereto to accommodate varying types of snowmobile structures.

The front mounting bracket, as shown in FIG. 11, similarly employs a pair of plates 170, 172 adapted to be positioned on either side of a transversely extending section of the snowmobile frame 12 near the front edges thereof and held in position thereon through suitable bolt and nut means, indicated generally at 175. The plate 170 or plate structure includes a cylindrical coupling member 175 suitably attached or connected thereto with a serrated edge 177 thereon. This portion of the plate structure connects with a second flange plate 180 having a similar cylindrical coupling member 182 at one end of the same. Plate 180 includes a slot therein to facilitate coupling of the same to the curved portion 34 of the mounting frame. The cylindrical coupling member 182 includes the serrated edge or surface which is adapted to abut with and meet with the coupling member 176 and a suitable connecting pin 185 extends through apertures in the coupling members 176, 182 to secure the same in assembled relationship. The serrated surfaces of the coupling members permit locking of the same together in varied angular relationship so as to facilitate mounting of the curved portion 34 of the mounting frame on varying types of snowmobile frames for the purpose of securing the frame thereto.

The embodiment shown in FIG. 12 discloses another type of rear mounting bracket for the snowmobile frame. In this version of the mounting frame, a separate tubular structure, indicated at 190, extends along the side of the snowmobile frame 12 and is connected to a plurality of individual mounting brackets through sleeve members 192 which are held tight to the tubular member 190 through suitable locking screws 192 extending therethrough. The sleeve members have plates 194 connected thereto which couple to the frame through U-shaped coupling members 195 adapted to be connected to the frame through suitable bolt type connections (not shown) extending through apertures 196 therein and with reinforcing plates 197 included on the undersurface of the snowmobile. The U-shaped coupling brackets have a plurality of the apertures 196 on the surfaces thereof so that it may be varied in position to adjustably position the tube 190 on varying snowmobile frame configurations. Two or more such frame members extend along each side of the snowmobile frame and a crossbracing member 200 extends across the end of the same. The crossbracing member 200 slidably fits through cylindrical sleeve members 201 at the ends of each of the tubular members on the sides of the snowmobile frame with the crossbracing member 200 being adjustably secured therein through locking bolts 204. A flange plate 205 is welded to the ends of the transverse or crossbracing member 200 with a suitable mounting pin 206 upstanding on the same which mounts the straight side members 32 of the mounting frame for the snowmobile cab. This will permit angular positioning of the mounting frame portions 32 of the snowmobile cab assembly to adapt it to varying types of snowmobile frames.

My improved snowmobile cab assembly is designed to provide a protective enclosure to the occupant or driver of the snowmobile as well as to provide a roll support structure on the vehicle for the safety of the occupant or driver thereof in the event of overturning of the snowmobile. The basic mounting frame for the cab assembly will be mounted on the snowmobile frame through a variety of mounting flanges which will permit positioning of the straight portions of the mounting frame assembly in a spaced parallel relationship with the sides of the frame and will permit connection of the frame to a snowmobile body for varying snowmobile configurations. The upstanding portion of the mounting frame will be positioned adjacent the windshield which may be permanently attached to the windshield of the snowmobile or removably attached thereto through suitable releasable snap couplings. When the windshield is to be included as part of the cab assembly, it will be attached to the cab mounting frame. Its mounting may include a deformable apron portion which fits around the hood to be drawn tight against the same. Suitable support members for the draw strings which tighten the same around the hood may be included in the front mounting brackets for the cab assembly mounting frame. The cab includes a brace structure with front and rear portions and interconnecting side portions to which are attached supporting panels at the bottom edges and top thereof. These panels facilitate mounting of curved Plexiglass plates for see-through vision in the cab as well as roll protection. The curved front and rear braces of the cab assembly are symmetrical with the mounting frame to provide a curved surface forming a part of the roll support structure and the parts thereof are made of a rigid tubular metal material sufficient to support the weight of the snowmobile as a roll bar. The cab assembly is mounted on the mounting frame through slide-type couplings with slots therein which permit sliding of the cab assembly off of the supporting mounting frame to remove the same, if desired. It will be held in position by means of a frictional lock structure for the open or closed position, and the rear panel of the cab structure may be recessed to fit around the seat of the snowmobile or include a deformable loose plastic back panel which will fit around and enclose the back seat being clear so that lights or suitable signals thereon will not be obstructed. The cab structure may be removed for racing or other use of the snowmobile, and the windshield portion is removable as well as the cab structure to permit escape from an overturned snowmobile should the cab structure be pinned beneath the same. The improved cab structure provides clear vision at all angles for the occupant or operator, and a substantially weather-type enclosure for safety and protection from the elements.

I claim:

1. A snowmobile cab adapted to be mounted on a snowmobile having an elongated frame with a cowl-covered engine at one end of the same and a track drive mechanism positioned beneath the elongated frame extending from the other end of the same comprising, a frame member generally U-shaped in form having spaced straight parallel and horizontally extending end portions and a transversely extending curved central portion, flange means connected to horizontally spaced parallel end portions of the frame member and adapted to be connected to the elongated frame of a snowmobile to mount the frame member on the snowmobile with the end portions generally parallel to the elongated frame and the curved central portion positioned vertically adjacent and around the cowl-covered engine of the snowmobile, an elongated brace having horizontally extending central portions with transversely extending curved portions at the ends of the same symmetrical with the curved central portion of the frame member, means slidably mounting said elongated brace on the parallel end portions of the frame member, a reinforcing member connected between the curved brace portions, and transparent covering means positioned over the brace of the cover structure such that the brace and reinforcing member with the covering means and the frame member form a protective cover and a roll structure for a snowmobile.

2. The snowmobile cab of claim 1 in which the frame member and the brace for a slidable cover structure are made of a tubular metal construction and in which the curved central portion of the frame member is adapted to be positioned relative to the cowl to abut a windshield associated therewith.

3. The snowmobile cab of claim 2 in which the curved portion of the brace at the rear of the snowmobile is inclined at an angle to the other curved portion of the brace such that the slidable cover structure has the greatest longitudinal dimension at the top of the cover structure and including additional covering means positioned over the curved portion of the brace at the rear of the snowmobile adapted to fit around the elongated frame of the snowmobile.

4. The snowmobile cab of claim 3 in which the additional covering means over the cover structure at the rear of the snowmobile is transparent and selectively removable.

5. The snowmobile cab of claim 4 and including windshield means connected to the curved central portion of the tubular frame member and adapted to fit around the cowl-covered engine.

6. The snowmobile cab of claim 5 in which the windshield means includes a rigid portion and a deformable portion at the sides of the cowl-covered engine with means for deforming the deformable portion of the windshield along the sides of the cowl to fit snugly over the same.

7. The snowmobile cab of claim 5 in which a the additional covering means over the rear of the cover structure is deformable to fit around a portion of the elongated frame of a snowmobile.

8. The snowmobile cab of claim 5 in which the additional covering means on the rear of the slidable cover structure has a recessed aperture therein adapted to fit around a portion of the elongated frame of a snowmobile.

9. The snowmobile cab of claim 5 and including means for releasably connecting the slidable cover structure to a closed position on the tubular frame member.

10. The snowmobile cab of claim 5 in which said windshield means includes releasable snap means positioned around the curved central portion of the tubular frame member to releasably mount the windshield on the frame member.

11. A protective enclosure for a snowmobile having an elongated frame with a hood covering an engine at one end of the same and steerable skiis with a track drive mechanism beneath the elongated frame comprising, a frame member generally U-shaped in form having spaced straight parallel and horizontally extending end portions and a transversely extending curved central portion with the end portions being adapted to fit around the sides of the elongated frame of the snowmobile and with the transversely extending curved central portion adapted to fit over the elongated frame adjacent the engine hood, flange means connected to the horizontally spaced parallel end portions of the frame and connected to the elongated frame of the snowmobile to mount the frame member on the snowmobile with the end portions generally parallel to the elongated frame and the curved central portion positioned generally vertical and adjacent the engine hood, windshield means removably connected to the curved central portion of the frame member fitting around the hood of the snowmobile and releasably secured thereto, said curved central portion of the frame member and said windshield means forming a protective enclosure for the snowmobile and a roll structure for the same.

12. The protective enclosure of claim 11 in which said windshield means includes releasable snap means positioned around the curved central portion of the frame member to releasably mount the windshield on the frame member.

13. The protective enclosure of claim 11 and including brace means having curved portions symmetrical with the shape of the curved central portion of the frame member and connected to the straight parallel extending end portions of the frame member and extending substantially normal thereto, and covering means connected to the brace means and forming with the frame member and windshield means a covering for the snowmobile and a protective roll structure for the same.

14. A snowmobile cab adapted to be mounted on a snowmobile having an elongated frame with a cowl-covered engine at one end of the same and a track drive mechanism positioned beneath the elongated frame extending from the other end of the same comprising, a frame member generally U-shaped in form having spaced straight parallel and horizontally extending end portions and a transversely extending curved central portion, flange means connected to horizontally spaced parallel end portions of the frame member and adapted to be connected to the elongated frame of a snowmobile to mount the frame member on the snowmobile with the end portions generally parallel to the elongated frame and the curved central portion positioned vertically adjacent and around the cowl-covered engine of the snowmobile, an elongated brace having horizontally extending central portions with transversely extending curved portions at the ends of the same symmetrical with the curved central portion of the frame member, means mounting said cover structure on the parallel end portions of the frame member, a reinforcing member connected between the curved brace portions, and covering means positioned over the brace of the cover structure such that the brace of the cover structure with the covering means thereon and the frame member form a protective cover and a roll structure for a snowmobile.

15. The snowmobile cab of claim 14 in which the covering means is formed of a Plexiglass material.

16. The snowmobile cab of claim 14 in which the frame member and the elongated brace of the cab structure are made of a tubular metal material.

17. The snowmobile cab of claim 14 and including windshield means removably connected to the curved central portion of the frame member and adapted to fit around the cowl-covered engine of the snowmobile.